(12) United States Patent
Flynn et al.

(10) Patent No.: US 10,536,339 B2
(45) Date of Patent: Jan. 14, 2020

(54) SYSTEMS AND METHODS FOR SYSTEM CONFIGURATION FOR COMMUNICATION NETWORK DEVICES

(71) Applicant: Level 3 Communications, LLC, Broomfield, CO (US)

(72) Inventors: Matthew D. Flynn, Fort Collins, CO (US); Lawrence W. Gowin, Westminster, CO (US); Ricky L. Nooner, Broomfield, CO (US); Shane Trotter, Broomfield, CO (US)

(73) Assignee: Level 3 Communications, LLC, Broomfield, CO (US)

(*) Notice: Subject to any disclaimer, the term of this patent is extended or adjusted under 35 U.S.C. 154(b) by 362 days.

(21) Appl. No.: 15/288,920

(22) Filed: Oct. 7, 2016

(65) Prior Publication Data

US 2017/0237619 A1 Aug. 17, 2017

Related U.S. Application Data (60) Provisional application No. 62/295,346, filed on Feb. 5, 2016.

(51) Int. Cl.
*H04L 12/24* (2006.01)

(52) U.S. Cl.
CPC ...... *H04L 41/0886* (2013.01); *H04L 41/0672* (2013.01); *H04L 41/0816* (2013.01); *H04L 41/22* (2013.01)

(58) Field of Classification Search
CPC . H04L 41/0886; H04L 41/0816; H04L 41/22; H04L 41/0672
See application file for complete search history.

(56) References Cited

U.S. PATENT DOCUMENTS

| | | |
|---|---|---|
| 5,263,126 A | 11/1993 | Chang |
| 2007/0055891 A1 | 3/2007 | Plotkin et al. |
| 2011/0047514 A1* | 2/2011 | Butin .............. G06F 9/453 715/841 |
| 2011/0225565 A1* | 9/2011 | van Velzen ........ G06F 9/5038 717/114 |
| 2013/0055063 A1* | 2/2013 | Mondal .............. G06F 9/4552 715/234 |
| 2013/0086037 A1 | 4/2013 | Hejlsberg et al. |
| 2013/0124908 A1 | 5/2013 | Gowin et al. |

(Continued)

OTHER PUBLICATIONS

International Preliminary Report on Patentability, dated Aug. 21, 2018, Int'l Appl. No. PCT/US16/056125, Int'l Filing Date Oct. 7, 2016; 8 pgs.

(Continued)

*Primary Examiner* — Austin J Moreau (57) ABSTRACT

Aspects of the present disclosure describe systems and methods for automatically configuring, managing, updating, and/or monitoring the configuration of various computing devices and/or network devices within a communications network, such as a telecommunications network. Basic input/output setting configurations for a network devices and/or cluster of network devices may be extracted from a template. Subsequently, a module may be identified and executed to configure the cluster based on configuration parameters defined within the template.

20 Claims, 4 Drawing Sheets

(56) References Cited

U.S. PATENT DOCUMENTS

| | | | |
|---|---|---|---|
| 2013/0326029 A1* | 12/2013 | Flynn .................. | H04L 41/0803 709/220 |
| 2015/0216142 A1* | 8/2015 | Landers ............... | A01K 15/023 119/721 |
| 2017/0010903 A1* | 1/2017 | Kidron .................. | G06F 3/0482 |

OTHER PUBLICATIONS

International Search Report dated Feb. 3, 2017, Int'l Appl. No. PCT/US16/056125, Int'l Filing Date Oct. 7, 2016; 3 pgs.
Written Opinion of the International Searching Authority dated Feb. 3, 2017, Int'l Appl. No. PCT/US16/056125, Int'l Filing Date Oct. 7, 2016; 6 pgs.

* cited by examiner

SYSTEMS AND METHODS FOR SYSTEM CONFIGURATION FOR COMMUNICATION NETWORK DEVICES

CROSS-RELATED APPLICATION

The present non-provisional application claims priority under 35 U.S.C. § 119 to co-pending U.S. Provisional Application No. 62/295,346 entitled "Systems And Methods For System Configuration For Communication Network Devices," filed on Feb. 15, 2016, and which is hereby incorporated by reference in its entirety.

TECHNICAL FIELD

Aspects of the present disclosure relate to communications networks, and in particular, to systems and methods for the automatic configuration of network devices within a communications network.

BACKGROUND

Communications networks provide voice and data communication between various types of computing devices including telephones, voice over IP (VoIP) phones, smart phones, tablets, personal computers, data servers, content servers, web servers and other possible end points. To provide such connectivity, most communication networks include a plurality of network devices, such as switches, routers and servers, interconnected by transmission links. When a device is first installed in the network, it often requires some form of configuration. Over time and in order to ensure quality service, the various network devices may require repair, replacement, and/or reconfiguration.

When a communications network requires upgrade, manual intervention by one or more system administrators is usually required. For example, a system administrator may manually intervene to configure and/or reconfigure network equipment. Such manual intervention by the system administrator is disruptive, time-consuming, expensive, and in some cases labor intensive. It is with these observations in mind, among others, that various aspects of the present disclosure were developed.

SUMMARY

Aspects of the present disclosure include systems, methods, and non-transitory computer-readable mediums for configuration. The systems, methods and non-transitory computer-readable mediums include executing, using a processing device comprising a controller, a module that automatically performs a plurality of actions at a user-interface, the plurality of actions defining configuration settings for at least one network device of a cluster of network devices deployed within a communications network. The systems, methods and non-transitory computer-readable mediums include translating, using the processing device, a first format of at least one action of the plurality of actions into a second format interpretable by the controller. The systems, methods and non-transitory computer-readable mediums include executing, using the processing device, the at least one action in the second format at the at least one network device.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

DETAILED DESCRIPTION

Aspects of the present disclosure describe systems and methods for automating user-interactions performed at a menu-based graphical user-interface ("GUI") to automatically set various configurations (e.g., basic input/output settings ("BIOS")) of network devices included within a communications network. In various aspects, a template may be accessed that defines the various configuration settings for a network device, such as a server, and/or a cluster of network devices, such as a cluster of servers. The settings defined within the template may be utilized by a module, which when executed, automatically applies the configuration settings of the network device and/or the cluster of network devices. More specifically, the module interacts with the menu-based GUI in a manner similar to a user when manually setting such configurations for the network device and/or or cluster of devices. Thus, in one embodiment, the module provides a mechanism for automatically emulating user interactions performed at the menu-based GUI when configuring a network device and/or a cluster of network devices.

In other aspects, using a domain-specific language, the output from the execution of the module may be captured and translated into a format for storage in some form of data structure or storage area, such as in a buffer logically organized as a two-dimensional array ("2D array") or other type of data structure. Subsequently, the re-formatted output may be transmitted to a controller (or other type of processing mechanism) that provides the output to an input thread in the form of one or more configuration commands for execution at the network device and/or cluster of network devices. Thus, systems disclosed herein may automatically identify and execute one or more configuration procedures at a network device and/or cluster of network devices.

Figure 1:
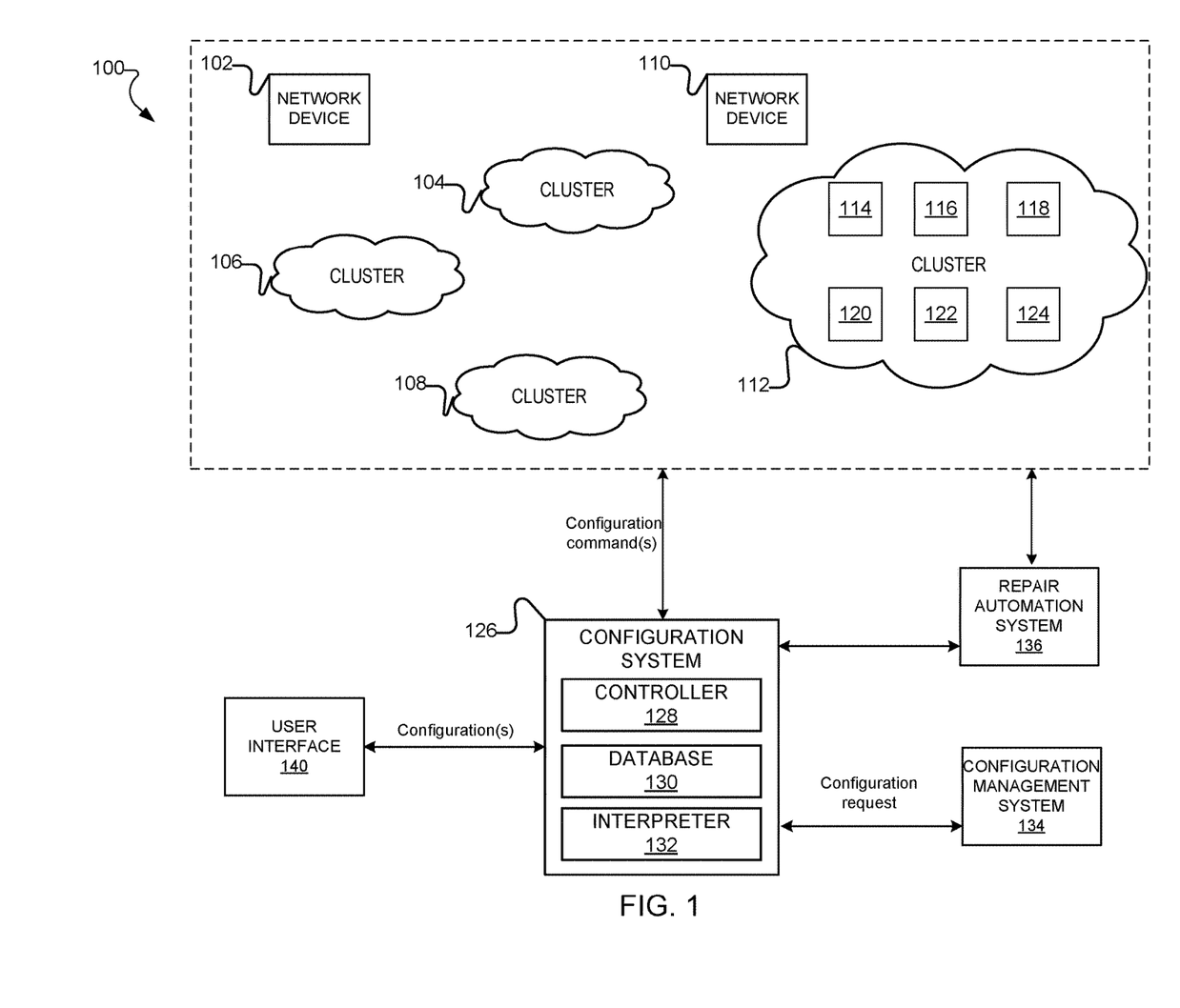
FIG. 1 is a block diagram illustrating a communications network, according to aspects of the present disclosure.

FIG. 1 illustrates an example communications network 100 comprising various network devices 108-114, any of which may be configured by a configuration system 126. The communications network 100 may be a telecommunications network, the Internet, an intranet, a local area network, a wireless local network, or any other type of communications network, as well as combinations of networks. For example, in one particular embodiment, the communications network 100 may be an optical telecommunications network and each network device 102 and 110 and/or cluster of network devices 104, 106, 108 and 112 may represent or otherwise include one or more: network elements, switches, routers, fiber optical links, boxes, and/or other telecommunications network devices that connect together to enable receiving and transmitting of data between various end users. As used herein, a box refers to a physical unit/machine that includes one or more processors, disk drives, memory, controllers, etc., capable of executing one or more applications, such as servers, server applications, etc. A box may also be generally described as including both hardware and software components and generally described as a server. The communications network may also encompass a data center in which many such network devices reside.

As further illustrated, the communications network 100 may include one or more clusters 104, 106, 108 and 112. A cluster represents the logical orientation and/or arrangement of various computing resources and/or network devices, such as switches, routers, servers, etc., that share a common purpose, perform a certain function, and/or which may be executed together in some coordinated manner. For example, clusters of servers are often used in telecommunications to provide a specific service, such as content distribution and management. Common types of content distribution include standard caching, streaming, secure socket layer secured data transmission, and the like. Using a cluster to provide such services improves performance and availability over that of a single computing resource, such as a single server. Accordingly, in one embodiment, the cluster 112 may include one or more servers 114-124 that may be loosely connected and logically arranged to perform and/or otherwise implement various tasks. Although the illustrated embodiment includes only servers within the cluster 112, it is contemplated that other types of resources may be included within a cluster, such as routers, switches, and the like, or some combination thereof.

The communications network 100 may be an IP-based telecommunications network, from a portion of the Internet, an intranet, a local area network, a wireless local network, a content distribution network, or any other type of communications network, as well as combinations of networks. For example, in one particular embodiment, the communications network 100 may be a telecommunications network including fiber-optic paths between various network elements, such as servers, switches, routers, and/or other optical telecommunications network devices that interconnect to enable receiving and transmitting of information between the various elements as well as users of the network.

A configuration system 126, located within the communications network 100 and/or communicatively connected to the communications network 100 may include a controller 128 for managing the configuration of the various network devices 102 and 110 and/or cluster of network devices 104, 106, 108 and 112. The configuration system 126 may further include a database 128 for storing and retrieving configuration templates, which may be used to configure the network devices 102 and 110 and/or cluster of network devices 104, 106, 108 and 112 of the communications network 100. Although the database 128 of FIG. 1 is depicted as being located within the configuration management system 126, it is contemplated that the database 128 may be located external to the configuration system 126, such as at a remote location, and may communicate with the configuration system 126. Additionally, the configuration system 126 may include an interpreter 132 containing code, which as will be described in further detail below, may be used to identify and generate commands for configuring one or more of the network devices 102 and 110 and/or the cluster of network devices 104, 106, 108 and 112.

The configuration system 126 may receive an indication that a network device and/or cluster of network devices require some level of configuration (e.g., establishing BIOS, Power-On Self-Test, Network, Storage). In response, the configuration system 126 may automatically identify and initiate one or more configuration procedures to configure the network devices 102 and 110 and/or the cluster of network devices 104, 106, 108 and 112 within the communications network 100. In one embodiment, the configuration system 126 may communicate with a configuration management system 134 to receive an indication that the network devices 102 and 110 and/or the cluster of network devices 104, 106, 108 and 112 within the communications network 100 require configuration. The configuration management system 134 automatically configures, tracks, and updates the configuration for the network resources and/or cluster of network resources within the communications network 100. U.S. patent application Ser. No. 13/673,550 entitled: "Systems And Methods For Automatic Replacement And Repair Of Communication Network Devices", filed on Nov. 9, 2012, provides example embodiments of the configuration management system 118, and is incorporated by reference in its entirety herein. Although the configuration system 126 is depicted in FIG. 1 as being external to configuration system 126, it is contemplated that the configuration management system 134 may be included within the configuration system 126.

To implement the configurations, in some embodiments, the configuration system 126 may communicate with a repair automation system 134 configured to automatically repair, replace, and/or configure (including BIOS configurations) the network devices 102 and 110 and/or the cluster of network devices 104, 106, 108 and 112 within the communications network 100. A detailed description of the repair automation system 136 is described in application Ser. No. 13/673,550 entitled: "Systems And Methods For Automatic Replacement And Repair Of Communication Network Devices", which is incorporated in its entirety by reference herein. While the configuration system 126 is illustrated as being in direct communication with the repair automation system 134, such as if the two systems resided on the same server or cluster of servers, it is contemplated that the configuration system 126 and the repair automation system 134 may also communicate and coordinate actions by way of a network.

Figure 2:
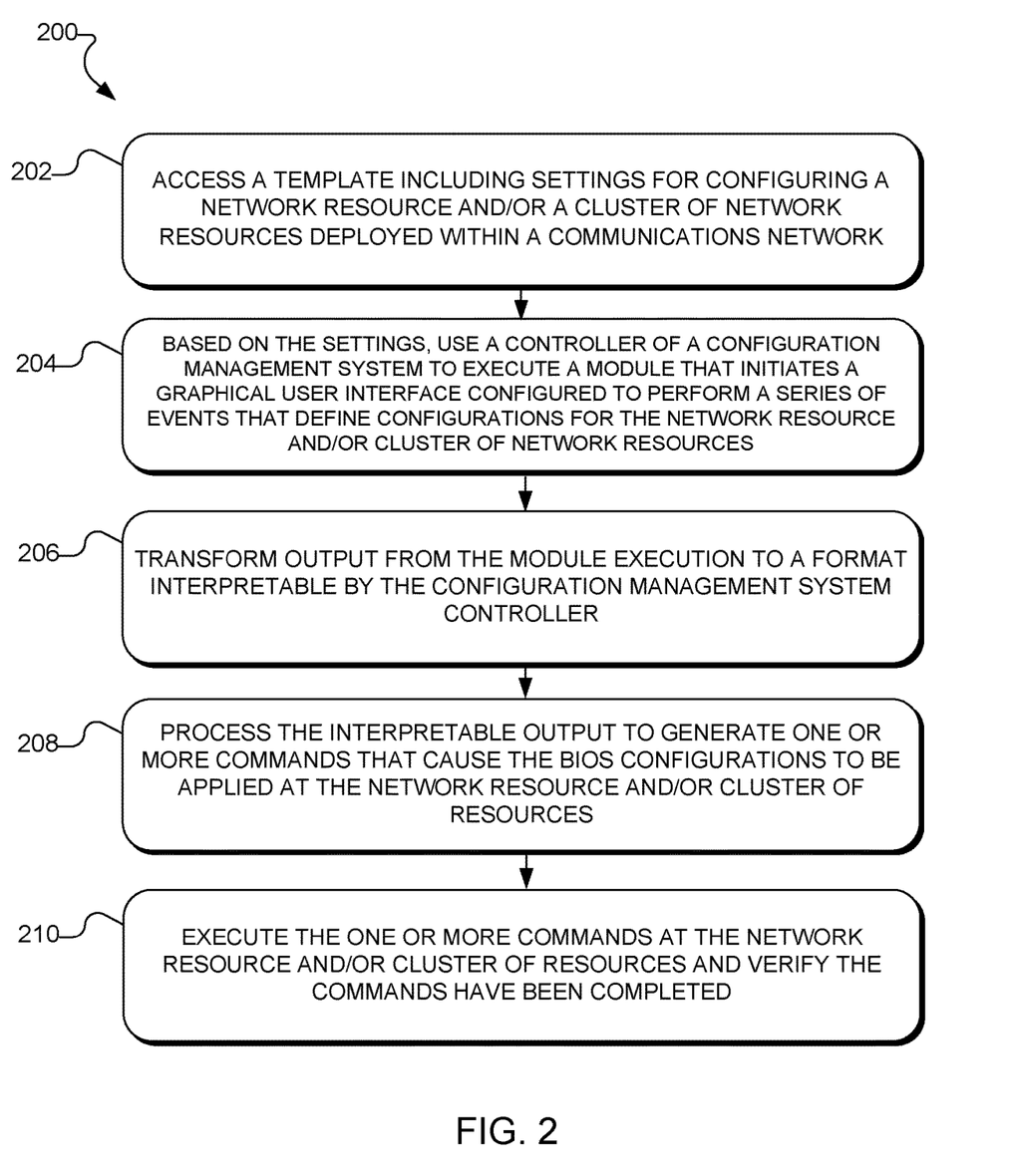
FIG. 2 is a flowchart illustrating an example process for configuring basic input/output settings for a network device, or cluster of network devices, according to aspects of the present disclosure.

Referring now to FIG. 2 and with general reference to FIG. 1, an illustrative process 200 for configuring a network device or cluster of networking devices is provided. As illustrated, process 200 begins with accessing a template that identifies settings for configuring various aspects of a network device and/or a cluster of network devices deployed within a communications network (operation 202). In one embodiment, the template includes abstracted network device and/or clustered network device configuration parameters. For example, if the network resource being configured is a server, the configuration parameters may include parameters describing the circuitry type (e.g., motherboard type) of the server, the resource utilization of the server, the load balancing type of the server, and so on. The templates may be constructed prior to their use to construct specific network device configurations. For example, the templates may be pre-stored in the database 128 of the configuration system 126. Alternatively, it is contemplated that users may interact with a user-interface generated by the configuration system 126 to generate the templates and/or modify the templates.

Once a template has been accessed, the template is processed and executed via a module that automatically initiates a graphical user-interface, which in turn, automatically performs a series of events and/or actions that define configurations for the particular network device and/or cluster of network devices (operation 304). Referring to FIG. 1, upon execution of the module at the configuration system 126, the controller 128 of the configuration system 126 automatically initiates a graphical user-interface that allows a user to manually configure the network device(s). Stated differently, under typical circumstances a user would interact with a user interface 140 to access the graphical user-interface and subsequently interact with various forms, buttons, selections, and/or components embedded with the graphical user-interface to configure the network device. In lieu of user-interaction, the module executed by the controller 128 automatically initiates the graphical user-interface and emulates the interactions of a user to configure the network device and/or cluster of network devices. In one embodiment, the graphical user-interface may be generated by and representative of the functionality of the repair automation system 134 and/or the configuration management system 134.

Figure 3A:
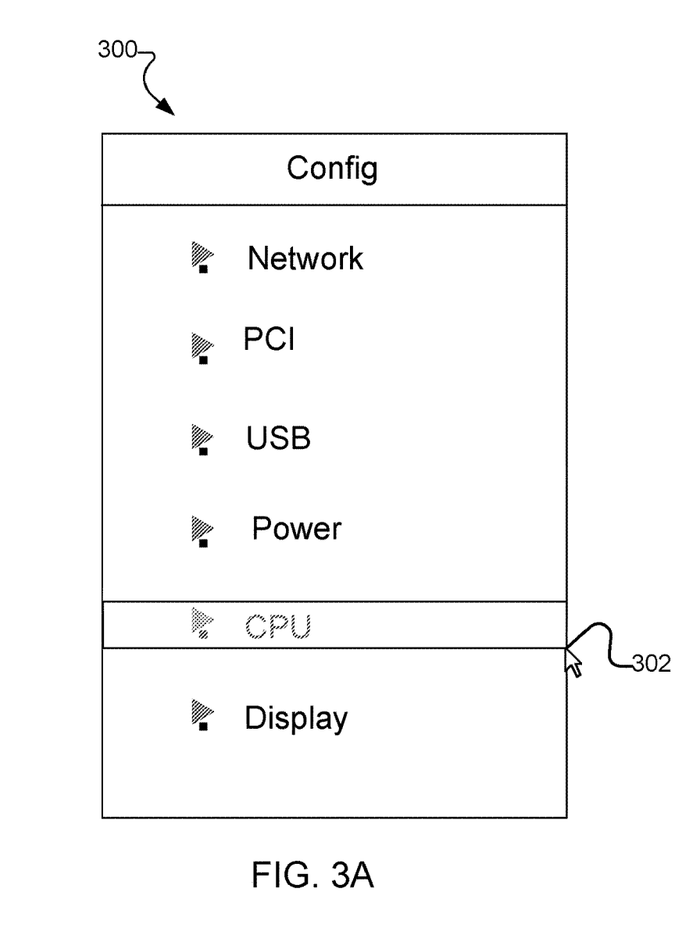
FIGS. 3A-3B are block diagrams illustrating a graphical user-interface, according to aspects of the present disclosure.
Figure 3B:
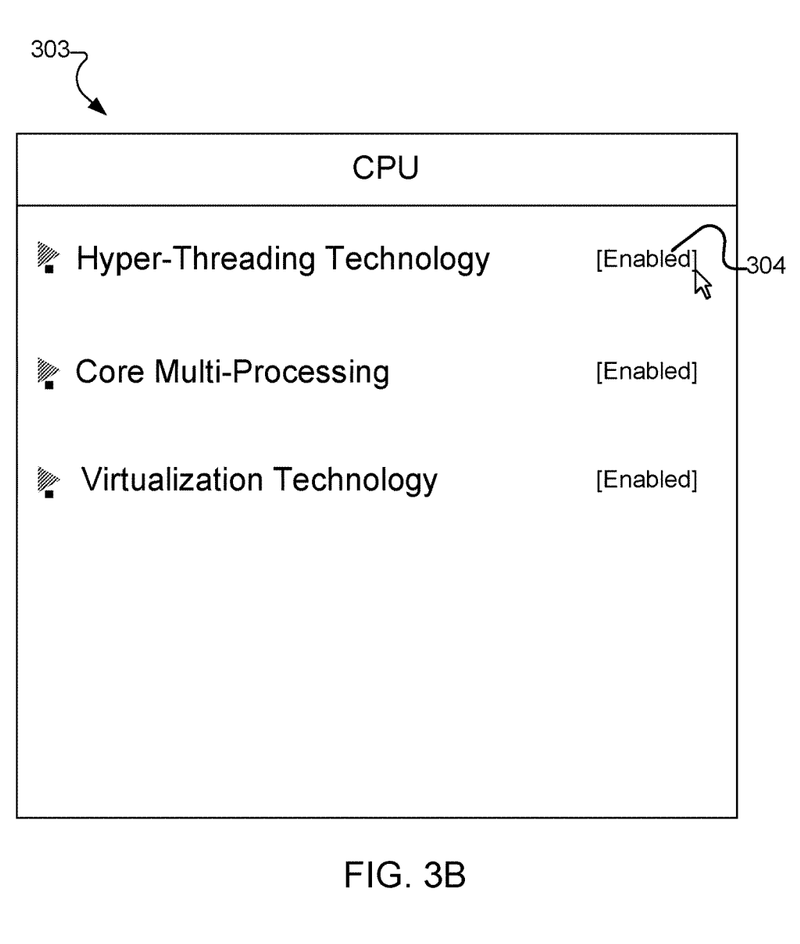

An illustrative example of a module automatically executing typical interactions of a user at a graphical user-interface for configuring BIOS of a network device and/or cluster of network devices will now be provided in conjunction with FIG. 3A-3B. Assume a user intends to enable hyper-threading for a set of servers as a BIOS configuration. To do so manually, a user would interact with a graphical-user interface 300 to select a drop-down menu to identify the appropriate CPU menu screen (at 302), which in turn would generate the CPU menu 303 that allows the user to select the hyper-threading BIOS configuration. The user would then enable hyper-threading by setting a component 304 of the CPU menu 303 indicating that hyper-threading should be enabled.

Instead of requiring actual input from users, the configuration system 126 automatically executes a module that processes a template including the configuration parameters that indicate that the set of servers should be configured to enable hyper-threading. Thus, the module automatically initiates the graphical user-interface 300, automatically selects the menu 302, and automatically activates the corresponding hyper-threading component 304, indicating that hyper-threading should be enabled for the servers, without any input from users.

The configurations of the present disclosure are not limited to BIOS configurations and, thus, may involve other types of configurations required by a network device and/or cluster of devices, such as network configurations, storage configurations, start-up and initialization configurations, upgrade configurations, and/or other software-related configurations, among others.

For example, the configurations may include network boot settings for network devices. More specifically and in one embodiment, the configurations may instruct the configuration system 126 on how to configure and install default network boot settings for a server from a remote location. Accordingly, assume a user intends to establish various settings that affect how a network device starts up upon activation or powering. To do so manually, a user may interact with a graphical user-interface (e.g., similar to graphical user interface 300) to select various menus and/or buttons that allow the user to apply the appropriate network boot configurations. Instead of a user providing the manual input, the configuration system 126 automatically executes a module that processes a template including the network boot settings, which indicate how the cluster of network devices boot settings should be installed. Thus, the module, executed by the controller 128 automatically initiates a graphical user-interface, automatically selects various network boot settings configuration menus, and automatically activates such network boot settings without any input from users.

In another example, the configurations may relate to power-on self-test ("POST") configurations for a server. More specifically, POST configurations may instruct the configuration system involve checking basic devices required to operate the server, memory testing of the server, controller initialization, and/or the like. To do so manually, a user may interact with a graphical user-interface (e.g., similar to graphical user interface 300) to select various menus and/or buttons that allow the user to apply the appropriate POST configurations. Instead of a user providing the manual input, the configuration system 126 automatically executes a module that processes a template including the POST configuration settings. Thus, the module automatically initiates a graphical user-interface, automatically selects various POST configuration menus, and automatically activates the desired POST configuration settings, without any input from users.

Referring again to FIG. 2, as each interaction at the graphical user-interface (initiated by the module) is being performed, the configuration system 126 simultaneously, continuously, and automatically (e.g., via a separate thread from the thread executing the module) transforms the output of the graphical user-interface from its native format generated by the graphical user-interface into a second format that is interpretable by the configuration system (operation 206). Since the graphical user-interface is an independent functioning application, the output describing the interactions that are occurring at the user-interface may not be interpretable by the configuration system 126, particularly the controller 128. Thus, using a domain specific language, the configuration system 126 converts the output (e.g., any visual objects) received from the graphical user-interface. Stated differently, the configuration system 126 includes the interpreter 132 that defines a collection of implementations of behavior capable of acting upon the output received from the graphical user-interface (e.g., the graphical user-interface 300). The implementations of behavior are written according to a domain specific language and with a well-defined interface by which the behavior is invoked. The various functions included within and/or executed by the interpreter 132 are used to encapsulate the output from the graphical-user interface (e.g., visual data objects) within the various functions of the domain specific language and thereby generate reformatted output, or output that is now interpretable by the controller 128. In one embodiment, the newly generated, interpretable output, may be stored in a buffer logically organized as a 2D array, although other arrangements are contemplated.

The data stored in the 2D array is processed to generate one or more commands that cause the configurations to be applied at the network device and/or the cluster of network devices (operation 308). Referring to FIG. 1, the controller 128, based on the data stored in the 2D array, generates execution commands for transmission to an input thread. More specifically, the controller 128 continually polls and/or listens for instructions from the configuration system 126 indicating that new configuration data has been stored in the 2D array. As soon as the controller 128 detects new output data stored in the 2D array(s), the controller 128 processes the data to extract a series of commands, which when executed, will actually implement the configurations at the desired network devices and/or the cluster of network devices.

Referring to the BIOS hyper-threading example above, after the relevant module has been executed, causing a graphical user-interface to enable hyper-threading as a configuration for the set of servers, the controller 128 will: access the two-dimensional array(s) maintaining the output generated from the execution of the graphical user-interface; and process the output to generate a series of configuration commands indicating that hyper-threading should be enabled. Portions of the generated command are then executed at the network device and/or the cluster of network devices and the configuration system 126 verifies that the respective commands have been completed (operation 210). Referring again to FIG. 1, the controller 128 may transmit the commands to an input thread that will apply the commands at the set of servers. In one embodiment, the commands may be transmitted to the repair automation system 136 in order to facilitate or otherwise execute the configuration of such resources. In another embodiment, the commands may be transmitted, all or in part, to the configuration management system 134 to perform the desired configurations.

In one embodiment, if the repair automation system 134 is responsible for executing the commands, the controller 128 continuously listens to the repair automation system 134 for a verification event. The controller verifies the system configuration by using a loop and timer to continuously scan the two dimensional array to check if the screen (or specific area specified in the config template) matches up with what is specified in the template. So the config template could specify "assert that XYZ exists anywhere on screen" or "assert that XYZ exists within these coordinates on screen". An area would be defined by coordinates such as (5,5) to (70, 20) for example.

Figure 4:
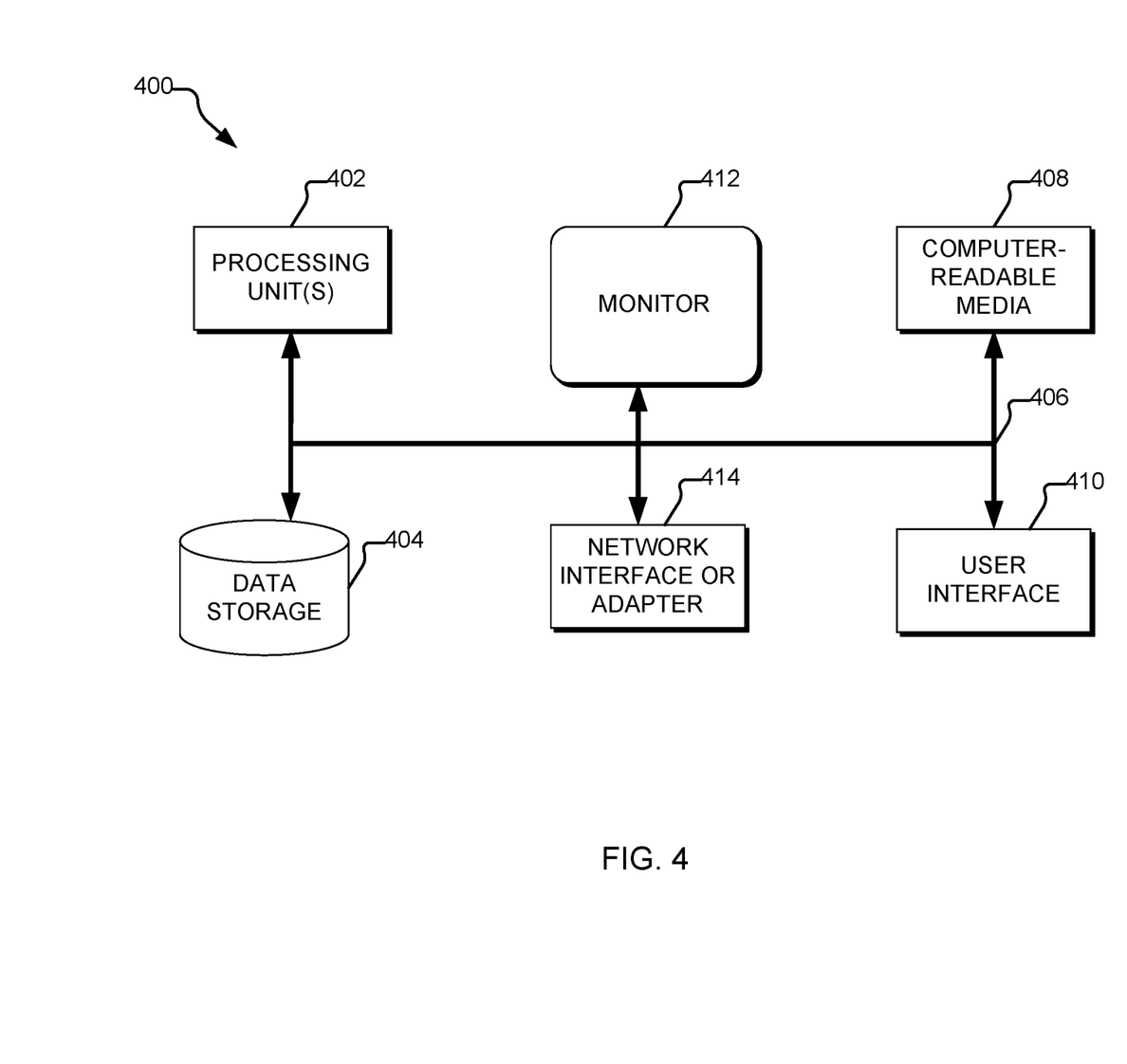
FIG. 4 is a block diagram illustrating a computing device for performing basic input/output configurations for network devices, according to aspects of the present disclosure.

FIG. 4 illustrates an example of a suitable computing and networking environment 400 that may be used to implement various aspects of the present disclosure described in FIG. 1-3A and 3B. As illustrated, the computing and networking environment 400 includes a general purpose computing device 400, although it is contemplated that the networking environment 400 may include one or more other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the computer 400 may include various hardware components, such as a processing unit 402, a data storage 404 (e.g., a system memory), and a system bus 406 that couples various system components of the computer 400 to the processing unit 402. The system bus 406 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 400 may further include a variety of computer-readable media 408 that includes removable/non-removable media and volatile/nonvolatile media, but excludes transitory propagated signals. Computer-readable media 408 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computer 400. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The data storage or system memory 404 includes computer storage media in the form of volatile/nonvolatile memory such as read only memory (ROM) and random access memory (RAM). A basic input/output system (BIOS), containing the basic routines that help to transfer information between elements within the computer 400 (e.g., during start-up) is typically stored in ROM. RAM typically contains data and/or program modules that are immediately accessible to and/or presently being operated on by processing unit 402. For example, in one embodiment, data storage 404 holds an operating system, application programs, and other program modules and program data.

Data storage 404 may also include other removable/non-removable, volatile/nonvolatile computer storage media. For example, data storage 404 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media, described above and illustrated in FIG. 4, provide storage of computer-readable instructions, data structures, program modules and other data for the computer 400.

A user may enter commands and information through a user interface 410 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices are often connected to the processing unit 402 through a user interface 410 that is coupled to the system bus 406, but may be connected by other interface and bus structures, such as a parallel port, game port or a universal serial bus (USB). A monitor 412 or other type of display device is also connected to the system bus 406 via an interface, such as a video interface. The monitor 412 may also be integrated with a touch-screen panel or the like.

The computer 400 may operate in a networked or cloud-computing environment using logical connections of a network interface or adapter 414 to one or more remote devices, such as a remote computer. The remote computer may be a personal computer, a server, a router, a network PC, a peer device or other common network node, and typically includes many or all of the elements described above relative to the computer 400. The logical connections depicted in FIG. 4 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 400 may be connected to a public and/or private network through the network interface or adapter 414. In such embodiments, a modem or other means for establishing communications over the network is connected to the system bus 406 via the network interface or adapter 414 or other appropriate mechanism. A wireless networking component including an interface and antenna may be coupled through a suitable device such as an access point or peer computer to a network. In a networked environment, program modules depicted relative to the computer 400, or portions thereof, may be stored in the remote memory storage device.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A method for configuration comprising:
executing, using a processing device comprising a controller, a module that automatically performs a plurality of actions at a user-interface, the plurality of actions defining configuration settings for at least one network device of a cluster of network devices deployed within a communications network;
performing, using the processing device, a first action of the plurality of actions, wherein the first action includes selecting a first configuration setting for the controller;
while performing the first action, translating, using the processing device, a first format of a second action of the plurality of actions into a second format interpretable by the controller, the first action being different than the second action, wherein the second action includes selecting a second configuration setting for the controller; and
executing, using the processing device, the first action or the second action in the second format at the at least one network device.

2. The method of claim 1, further comprising:
identifying a plurality of settings from a template describing a configuration for the cluster of network devices; and
generating the module by:
encapsulating the at least one setting of the plurality of settings with a function of a domain specific language into an executable instruction of the module.

3. The method of claim 1, wherein executing the first action or the second action comprises:
transmitting the first action or the second action from the controller to an input thread executing concurrently with the controller; and
transmitting the first action or the second action from the input thread to a repair automation system, wherein the repair automation system manages the configuration of the at least one network device by:
automatically executing the first action or the second action as a repair procedure on the at least one network device.

4. The method of claim 1, further comprising verifying that the first action or the second action in the second format was executed at the at least one resource of the cluster of network devices.

5. The method of claim 1, wherein the configuration settings are at least one of basic input/output settings, power-on self-test settings, and network settings.

6. The method of claim 1, wherein the second format is maintained in a two-dimensional array and wherein the user-interface is at least one of a console interface, command-line interface, and a graphical user-interface.

7. A system for configuration comprising:
a configuration system comprising a controller to:
execute a module that automatically performs a plurality of actions at a user-interface, the plurality of actions defining configuration settings for at least one network device of a cluster of network devices deployed within a communications network;
perform a first action of the plurality of actions, wherein the first action includes selecting a first configuration setting for the controller;
while performing the first action, translate a first format of a second action of the plurality of actions into a second format interpretable by a controller, the first action being different than the second action, wherein the second action includes selecting a second configuration setting for the controller; and
execute the first action or the second action in the second format at the at least one network device.

8. The system of claim 7, wherein the controller is further configured to:
identify a plurality of settings from a template describing a configuration for the cluster of network devices; and
generate the module by:
encapsulating the at least one setting of the plurality of settings with a function of a domain specific language into an executable instruction of the module.

9. The system of claim 7, wherein to execute the first action or the second action comprises:
transmitting the first or the second action from the controller to an input thread executing concurrently with the controller; and
transmitting the first action or the second action from the input thread to a repair automation system, wherein the repair automation system manages the configuration of the at least one network device by:
automatically executing the first action or the second action as a repair procedure on the at least one network device.

10. The system of claim 7, wherein the controller is further configured to verify that the first action or the second action in the second format was executed at the at least one network device of the cluster of network devices.

11. The method of claim 7, wherein the configuration settings are at least one of basic input/output settings, power-on self-test settings, and network settings.

12. The system of claim 7, wherein the second format is maintained in a two-dimensional array and wherein the user-interface is at least one of a console interface, command-line interface, and a graphical user-interface.

13. A method for configuration comprising:
identifying, using a processing device comprising a processor, a plurality of settings from a template describing a configuration for a cluster of network devices deployed within a communications network;
executing, using the processor, a module corresponding to the template to automatically cause a user-interface to perform a plurality of actions defining configuration settings for the cluster of network devices;
performing, using the processor, a first action of the plurality of actions, wherein the first action includes selecting a first configuration setting for the controller;
while performing the first action, translating, using the processor, a first format of a second action of the plurality of actions into a second format interpretable by the processor, the first action being different than the second action, wherein the second action includes selecting a second configuration setting for the controller; and
transmitting, using the processor, the first action or the second action in the second format to an input thread for execution at the cluster of network devices.

14. A non-transitory computer readable medium encoded with instructions for configuration, the instructions, executable by a processor, comprising:
executing a module that automatically performs a plurality of actions at a user-interface, the plurality of actions defining configuration settings for at least one network device of a cluster of network devices deployed within a communications network;
performing a first action of the plurality of actions, wherein the first action includes selecting a first configuration setting for the controller;
while performing the first action, translating a first format of second action of the plurality of actions into a second format interpretable by a controller, the first action being different than the second action, wherein the second action includes selecting a second configuration setting for the controller; and
executing the first action or the second action in the second format at the at least one network device.

15. The non-transitory computer readable medium of claim 14, further comprising:
identifying a plurality of settings from a template describing a configuration for the cluster of network devices; and
generating the module by:
encapsulating the at least one setting of the plurality of settings with a function of a domain specific language into an executable instruction of the module.

16. The non-transitory computer readable medium of claim 14, wherein executing the first action or the second action comprises:
transmitting the first action or the second action from the controller to an input thread executing concurrently with the controller; and
transmitting the first action or the second action from the input thread to a repair automation system, wherein the repair automation system manages the configuration of the at least one network device by:
automatically executing the first action or the second action as a repair procedure on the at least one network device.

17. The non-transitory computer readable medium of claim 14, further comprising verifying that the first action or the second action in the second format was executed at the at least one network device of the cluster of network devices.

18. The non-transitory computer readable medium of claim 14, wherein the configuration settings are at least one of basic input/output settings, power-on self-test settings, and network settings.

19. The non-transitory computer readable medium of claim 14, wherein the second format is maintained in a two-dimensional array and wherein the user-interface is at least one of a console interface, command-line interface, and a graphical user-interface.

20. The method of claim 1, wherein the first format is an output of the user-interface that is not interpretable by the controller.

* * * * *